United States Patent [19]

Wenzel et al.

[11] Patent Number: 5,428,994
[45] Date of Patent: Jul. 4, 1995

[54] CALORIMETRIC FLOW INDICATOR

[75] Inventors: Manfred Wenzel, Hofheim; Jürgen Willner, Schwalbach, both of Germany

[73] Assignee: Klaus Kobold, Belleair Shore, Fla.

[21] Appl. No.: 126,651

[22] Filed: Sep. 27, 1993

[30] Foreign Application Priority Data

Oct. 2, 1992 [DE] Germany .................. 42 33 284.2

[51] Int. Cl.⁶ .................................... G01F 1/68
[52] U.S. Cl. ........................ 73/204.22; 73/204.25; 73/204.26; 73/204.27
[58] Field of Search ........... 73/204.25, 204.26, 204.27, 73/204.22

[56] References Cited

U.S. PATENT DOCUMENTS

| | | | |
|---|---|---|---|
| 3,754,201 | 8/1973 | Adams | 73/204.25 |
| 3,945,252 | 3/1976 | Fiore | 73/204.27 |
| 4,142,170 | 2/1979 | Blatter | 73/204 |
| 4,932,256 | 6/1990 | Buck et al. | 73/204.26 |
| 5,040,901 | 8/1991 | Suzuki | 73/204.25 |

Primary Examiner—Richard E. Chilcot, Jr.
Assistant Examiner—Jewel V. Artis
Attorney, Agent, or Firm—Wenderoth, Lind & Ponack

[57] ABSTRACT

A calorimetric flow indicator includes a sensor element which forms a temperature-dependent resistance and which heats up in a short period of time by application thereto of electrical current. A resistance variation of the sensor element, induced by cooling, represents a measure of flow velocity of a medium flowing by the sensor element. The sensor element rests against an inner surface of a front wall of a housing projecting into the flowing medium. That section of the housing that includes the front wall and projects into the flowing medium has the shape of an obtusely truncated cone.

13 Claims, 1 Drawing Sheet

CALORIMETRIC FLOW INDICATOR

BACKGROUND OF THE INVENTION

The invention relates to a calorimetric flow indicator including a sensor element, which forms a temperature-dependent resistance and which heats up in a short period of time by means of electrical current heat. Resistance variation, induced by cooling, of the sensor represents a measure of flow velocity of a medium flowing by the sensor element and is measured. The sensor element rests against an inner surface of a front wall of a housing projecting into the flowing medium.

Such a flow indicator is known and includes a metal housing having virtually a cylindrical front section projecting into a medium flowing, e.g., in a line. Thus, the measurement result can be falsified or influenced, e.g., due to narrowing of the cross section of the free flow area. Furthermore, with such known flow indicators guaranteeing a repeatable production of heat transmission from the sensor element into the flowing medium, i.e. a reliable heat conduction coupling therebetween, is problematic. Such condition is very important since the measurement effect, i.e. the effect measured as the resistance variation, is usually only a few percent of the temperature-dependent resistance of the sensor,

SUMMARY OF THE INVENTION

Therefore, the object of the invention is to provide a flow indicator of the aforementioned type, but having higher accuracy of measurement and repeatability.

This object is achieved according to the invention by designing that section of the metal housing that includes the front wall and projects into the flowing medium as a truncated cone. Such exclusively tapered design has a positive effect on the flow conditions in the region of the front wall against whose inner surface the sensor element rests. The deposition of disturbing impurities, which are dragged along with the medium to be measured, is also prevented. Thus, the flow velocity can be measured reliably.

A reliably repeatable heat transmission can be obtained if, according to another embodiment of the invention, the tapered segment is made with precision especially in the region of the front wall, after metal cutting prefabrication by means of stamping. Thus, not only the thickness of the front wall is fabricated with high precision, but also the inner surface against which the sensor element rests is planar to high precision that facilitates the transmission of heat.

According to another proposal of the invention, the sensor element, whose heat conducting, electrically insulating layer rests against the inner surface of the front wall, is pressed so as to make heat conducting contact against the inner surface by means of a mounting, which is inserted so as to be frictionally engaged into a longitudinal borehole of the housing and which is made, e.g., of plastic. Thus, with a simple assembly a reliable transmission of heat from the sensor element into the flowing medium is permanently obtained.

To guarantee as constant and as permanent a transmission of heat as possible from the sensor element into the flowing medium, the sensor element has a heat conducting, electrically insulating layer facing the inner surface of the front wall and soldered to the inner surface or attached by way of a metal interface.

Tolerances during assembly can be compensated for in a simple manner without the risk of damaging the sensor element, if the sensor element is braced against a pad which is made of a rubber elastic material and provided on the front side of the mounting. Electrical connecting lines for the sensor element expediently can pass through the mounting and through the pad. For strain relief it is also advantageous if a connecting cable of the connecting lines is compressed in the mounting.

BRIEF DESCRIPTION OF THE DRAWINGS

Other objects, features, advantages and possible applications of the invention will be apparent from the following description with reference to the accompanying drawings. At the same time, all described and/or illustrated features form by themselves or in any logical combination the subject matter of the present invention, even independently of their summaries in the claims or their references.

DETAILED DESCRIPTION OF THE INVENTION

Figure 1:
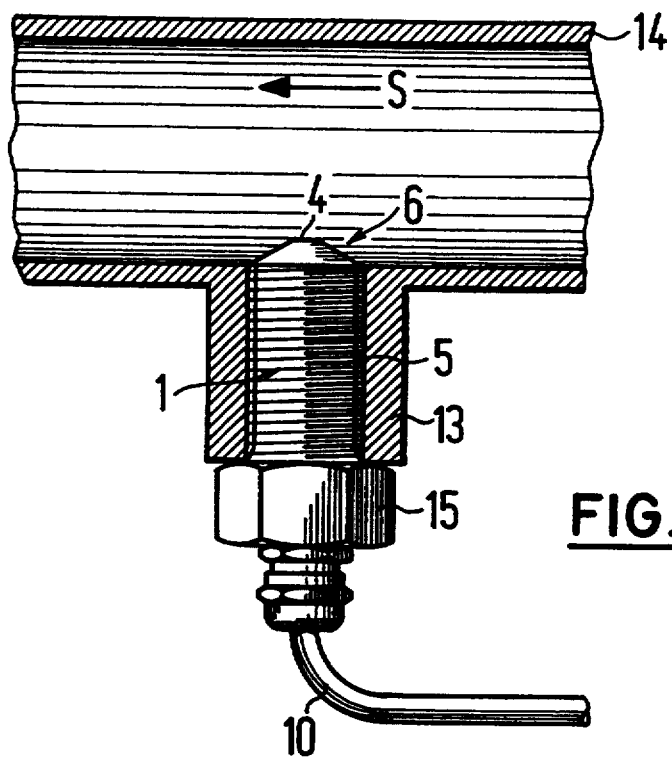
FIG. 1 is a partial section depicting a calorimetric flow indicator according to the invention and shown threaded into a side support of a line.

A calorimetric flow indicator 1 includes a metal housing 5, which is provided with an outer thread 12 in order to be threaded into a side coupling or support 13 of a pipe line 14 through which passes a flowing medium such as cooling water. The main section of housing 5 is designed somewhat cylindrically, and an outer end of housing 5 is provided with an outer hexagon-shaped portion 15. A front section 6 of the housing 5, which projects into the flowing medium the flow velocity of which is to be indicated, is designed as an obtusely or bluntly truncated cone and includes a relatively thin front wall 4. A sensor element 2 forming a temperature-dependent resistance rests with good thermal contact, but electrically insulated, against a flat inner surface 3 of the front wall 4. The housing 5 has therein a longitudinal borehole 11 which ends at the front wall 4. A plastic mounting 7 is inserted securely into the longitudinal borehole 11. A front end of the mounting 7 bears a pad 8 made of elastic rubber or similar heat and electrically insulating material. The sensor element 2 is braced rearwardly by and against pad 8, thereby compensating for variation of element 2. Connecting lines 9 for the sensor element 2 are run through the mounting 7 and the pad 8. A connecting cable 10 of the connecting lines 9 is compressed in the mounting 7.

Figure 3:
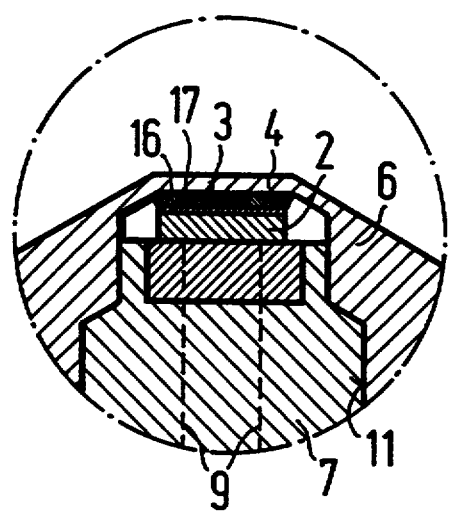
FIG. 3 is an enlarged detail view of area III from FIG. 2.
Figure 2:
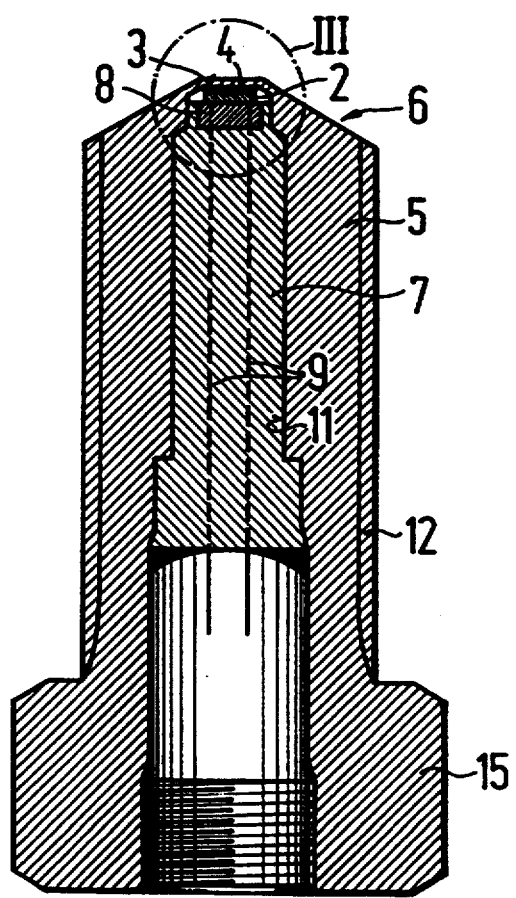
FIG. 2 is a longitudinal sectional view of such flow indicator.

FIG. 3 shows a variation, where the sensor element 2 is attached, at a side of a heat conducting, electrically insulating layer 16 thereof, so the inner surface 3 of the front wall 4 by means of a permanent solder connection 17 or other metal connection.

We claim:

1. A calorimetric flow indicator to indicate flow velocity of a flowing medium, said flow indicator comprising:

a housing including a main section having a substantially cylindrical configuration and a front section to project from said main section into the flowing medium, said front section entirely being of a truncated conical configuration extending obtusely angled inwardly from said main section such that substantially no cylindrical portion of said housing with project into the flowing medium, said front section including a front wall having an outer surface to be exposed to the flowing medium and an inner surface; and a sensor element mounted against said inner surface of said front wall, said sensor element comprising a temperature-dependent resistance capable of being heated by the application thereto of an electrical current, whereby measurable resistance of said sensor element is variable by variation in temperature thereof as a function of velocity of flow of the flow medium across said outer surface.

2. A flow indicator as claimed in claim 1, wherein said main section, said front section and said front wall comprise a unitary, one-piece structure.

3. A flow indicator as claimed in claim 1, wherein said housing is formed from metal by stamping, such that said front wall has a uniform thickness and said inner surface is planar to a high degree of precision.

4. A flow indicator as claimed in claim 1, wherein said sensor element includes a heat conducting, electrically insulating layer resting against said inner surface.

5. A flow indicator as claimed in claim 1, wherein said sensor element is attached to said inner surface by a metal connection.

6. A flow indicator as claimed in claim 1, wherein said housing has therein a bore, and further comprising a mounting inserted frictionally in said bore and urging said sensor element toward said inner surface to provide heat conduction between said sensor element and said front wall.

7. A flow indicator as claimed in claim 6, wherein said mounting is formed of plastic.

8. A flow indicator as claimed in claim 6 further comprising an elastic pad provided between said mounting and said sensor element and braced therebetween.

9. A flow indicator as claimed in claim 8, wherein said pad is formed of rubber.

10. A flow indicator as claimed in claim 8, further comprising electrical lines connected to said sensor element and passing through said pad and said mounting.

11. A flow indicator as claimed in claim 10, further comprising a cable for said electrical lines compressed in said mounting.

12. A flow indicator as claimed in claim 10, wherein application of electric current through said lines heats said sensor element, and said sensor element thereby heats said front wall by conduction.

13. A flow indicator as claimed in claim 1, wherein heating of said sensor element by application thereto of electrical current causes said sensor element to heat said front wall by heat conduction.

* * * * *